United States Patent [19]
Shigemoto et al.

[11] Patent Number: 5,480,718
[45] Date of Patent: * Jan. 2, 1996

[54] LAMINATED FILM OR SHEET AND BOX-SHAPED VESSEL PREPARED THEREFROM

[75] Inventors: Hiromi Shigemoto; Katsumi Noritomi, both of Waki, Japan

[73] Assignee: Mitsui Petrochemical Industries, Ltd., Tokyo, Japan

[ * ] Notice: The portion of the term of this patent subsequent to Jan. 29, 2008, has been disclaimed.

[21] Appl. No.: 873,623

[22] Filed: Apr. 23, 1992

Related U.S. Application Data

[63] Continuation of Ser. No. 509,302, Apr. 16, 1990, abandoned.

[30] Foreign Application Priority Data

| Apr. 17, 1989 | [JP] | Japan | 1-95292 |
| Apr. 17, 1989 | [JP] | Japan | 1-95293 |
| May 18, 1989 | [JP] | Japan | 1-125413 |
| May 24, 1989 | [JP] | Japan | 1-128668 |

[51] Int. Cl.$^6$ .............................. B32B 7/12; B32B 27/08
[52] U.S. Cl. .................. 428/342; 428/213; 428/511; 428/512; 428/513; 428/516; 428/517; 428/537.5; 428/34.3; 428/35.2; 428/35.9; 428/481; 428/483; 206/524.2; 220/415; 220/418
[58] Field of Search ...................... 428/213, 511, 428/481, 512, 513, 515, 516, 517, 483, 537.5, 34.3, 35.2, 35.9, 34.2; 525/240; 206/524.2; 220/415, 418

[56] References Cited

U.S. PATENT DOCUMENTS

| 4,546,150 | 10/1985 | Shigemoto | 525/240 |
| 4,988,558 | 1/1991 | Shigemoto | 428/213 |
| 5,077,123 | 12/1991 | Shigemoto et al. | 428/349 |

*Primary Examiner*—Charles R. Nold
*Attorney, Agent, or Firm*—Sherman and Shalloway

[57] ABSTRACT

Disclosed is a laminated film or sheet comprising poly-4-methyl-1-pentene laminated on a paper layer. By using poly-4-methyl-1-pentene having a low melting point, formation of cracks and other defects in the resin layer is prevented and the oil and fat impermeability is improved. If an intermediate layer of a specific polymer is formed in addition to the poly-4-methyl-1-pentene layer, the oil and fat impermeability is further improved. A box-shaped vessel (carton) and a release paper for an artificial leather can be prepared from this laminated film or sheet.

16 Claims, No Drawings

LAMINATED FILM OR SHEET AND BOX-SHAPED VESSEL PREPARED THEREFROM

This application is a continuation of application Ser. No. 07/509,302, filed Apr. 16, 1990, now abandoned.

BACKGROUND OF THE INVENTION (1) Field of the Invention

The present invention relates to a film or sheet composed of a laminate comprising a layer of a specific resin and a paper layer, and a box-shaped vessel (hereinafter referred to as "carton") prepared from this film or sheet.

More particularly, the present invention relates to a film or sheet having an excellent oil and fat impermeability, which is composed of a laminate comprising a layer of poly-4-methyl-1-pentene having a melting point within a specific range and a paper layer, or a laminate comprising a layer of ordinary poly-4-methyl-1-pentene, an intermediate layer of a specific resin and a paper layer, and also to a carton prepared from this film or sheet.

(2) Description of the Related Art

Recently, the cooking method using an electronic oven has made a rapid progress, and a variety of foods such as dishes and cakes can be easily prepared by using an electronic oven.

When a food is cooked by an electronic oven, the food to be cooked is contained in a tray-shaped vessel formed of a laminate comprising, for example, an inner layer of a 4-methyl-1-pentene polymer and an outer paper layer, and the food is subjected to high-frequency heating.

Foods to be cooked include foods containing oil and fat components such as butter and margarine, for example, pound cakes, and foods on which a sauce containing oil and fat components is poured to complete cooking after heating, and it sometimes happens that after heating in an electronic oven or after pouring of a sauce containing oil and fat components after side heating, foods are preserved in a box-shaped vessel.

Since the heretofore used covering layer of a 4-methyl-1-pentene polymer has a high rigidity, fine cracks are sometimes formed in the covering layer. Moreover, when oil and fat components as described above are present, they permeate into the paper layer constituting the vessel with the lapse of time, the paper layer as a whole becomes oily to degrade the appearance of the vessel, and there is a risk of contamination of the hand or clothing with oil and fat components at the time of handling.

SUMMARY OF THE INVENTION

It is a primary object of the present invention to provide a laminated film or sheet in which formation of cracks in the covering layer is prevented so that permeation of oil and fat components from a contained cooked food is prevented, and a carton prepared from this film or sheet.

Another object of the present invention is to provide a laminated film or sheet in which by forming an intermediate layer of a specific resin in addition to a covering layer of a 4-methyl-1-pentene polymer, permeation of oil and fat components from a contained cooked food can be prevented, and a carton prepared from this laminated film or sheet.

In accordance with one fundamental aspect of the present invention, the foregoing objects can be attained by providing a laminated film or sheet having at least two layers, which comprises (A) a layer of poly-4-methyl-1-pentene having a melting point of 190° to 230° C. and (B) a paper layer.

In accordance with another aspect of the present invention, there is provided a laminated film or sheet having at least three layers, which comprises (A) a layer of poly-4-methyl-1-pentene, (B) an intermediate layer of a propylene polymer and (C) a paper layer.

In this laminated film or sheet, the melting point of the poly-4-methyl-1-pentene constituting the inner layer is generally 190° to 245° C. and preferably 200° to 235° C. The propylene polymer constituting the intermediate layer is a propylene homopolymer or propylene/ethylene random copolymer having MFR (melt flow rate) of 1 to 200 g/10 min, preferably 10 to 100 g/100 min.

In accordance with still another aspect of the present invention, there is provided a laminated film or sheet having at least three layers, which comprises (A) a layer of poly-4-methyl-1-pentene, (B) an intermediate layer of a polyester type polymer and (C) a paper layer.

In this laminated film or sheet comprising the above-mentioned intermediate layer, the permeation of oil and fat components into the paper layer is further prevented, and a carton having an excellent oil resistance can be prepared from this laminated film or sheet.

In accordance with still another aspect of the present invention, there is provided a laminated film or sheet having at least three layers, which comprises (A) a layer of poly-4-methyl-1-pentene having a high melting point, (B) an intermediate layer of poly-4-methyl-1-pentene having a low melting point and (C) a paper layer.

The melting point of the high-melting-point poly-4-methyl-1-pentene constituting one layer of this laminated film or sheet is 220° to 245° C., and the melting point of the low-melting-point poly-4-methyl-1-pentene constituting the intermediate layer is 190° to 230° C.

If the covering layer is divided into two layers composed of poly-4-methyl-1-pentenes differing in the characteristics and the intermediate layer is formed of poly-4-methyl-1-pentene having a low melting point, the resistance to permeation of oil and fat components is highly improved.

DETAILED DESCRIPTION OF THE PREFERRED EMBODIMENTS

In the laminated film or sheet of the present invention, the covering layer is formed of poly-4-methyl-1-pentene.

The poly-4-methyl-1-pentene used in the present invention is a homopolymer of 4-methyl-1-pentene or a copolymer of 4-methyl-1-pentene with up to 20 mole %, preferably up to 12 mole % of an α-olefin having 2 to 20 carbon atoms, such as ethylene, propylene, 1-butene, 1-hexene, 1-octene, 1-decene, 2-tetradecene or 1-octadecene. Crystalline poly-4-methyl-1-pentene having a melting point of 190° to 230° C. is preferably used. This polymer can be prepared according to a known process, for example, the process disclosed in Japanese Unexamined Patent Publication No. 59-206418. MFR of the poly-4-methyl-1-pentene is preferably 5 to 1000 g/10 min, and poly-4-methyl-1-pentene having MFR of 70 to 300 g/10 min is especially preferably used because moldability and heat resistance are very good.

In general, increase of the amount of the α-olefin to be copolymerized results in lowering of the melting point, but the melting point is influenced by the kind of the α-olefin, the catalyst used and other polymerization conditions. However, since the relations of these factors to the melting point can be experimentally determined in advance, persons skilled in the art will easily obtain poly-4-methyl-1-pentene having a desired melting point.

If a layer of poly-4-methyl-1-pentene having a relatively low melting point of 190° to 230° C. is laminated with a paper layer, even under heating in an electronic oven, the above-mentioned oil and fat components are not allowed to permeate into the paper layer, and therefore, a laminated film or sheet suitable as a vessel material can be provided.

Papers customarily used as the material for boxes or cases, such as clay-coated paper and milk carton paper, can be used as the paper constituting the paper layer. However, use of clay-coated paper is recommended because the permeation rate of oil and fat components can be maintained at a very low level even if pinholes or small cracks are formed in the poly-4-methyl-1-pentene layer by unexpected shock or rubbing or even if the oil and fat components happen to permeate from the end face of the laminated film or sheet. Moreover, since this clay-coated paper is excellent in the printability, the laminated sheet or film is suitably used as a base material to be printed when a print layer is formed on the surface of the vessel according to need.

The laminated film or sheet of the present invention can be prepared by extrusion-coating poly-4-methyl-1-pentene directly on the surface of paper, or by extrusion-coating poly-4-methyl-mentene on the surface of paper which has been subjected to an adhesiveness-increasing treatment according to a known method, for example, by coating the paper surface with an anchor coat agent of an organic titanium, polyethyleneimine or isocyanate type or bonding an adhesive polyolefin or high-pressure polyethylene as the undercoat to the paper surface. In the latter case, a laminated film or sheet having a three-layer structure is obtained.

Formation of Laminated Film or Sheet

The poly-4-methyl-1-pentene constituting the inner layer of the laminate of the present invention is excellent in the adaptability to extrusion coating at a high speed, and therefore, the poly-4-methyl-1-pentene can be extrusion-coated at a high speed by using an ordinary extrusion-coating apparatus. By this extrusion coating a laminated film or sheet having excellent mechanical properties and interlaminar adhesiveness can be obtained. If a gas such as air or nitrogen gas is blown to both the ends of the extruded film or sheet at the extrusion coating, neck-in or edge wave at both the ends of the extruded film or sheet can be prevented, and in this case, if blowing of the gas is effected in the vicinity of the point of the contact of the extruded film or sheet with the paper substrate from the side where the extruded film or sheet is not contacted with the paper substrate, the extrusion coating is accomplished at a high speed more stably.

As the method for blowing a gas to the extruded film or sheet, there can be mentioned a method in which a metal tube such as an aluminum tube or copper tube or a conduit tube such as a thermoplastic resin tube is arranged downstream of a die, and a gas is blown to the extruded film or sheet of poly-4-methyl-1-pentene at an optional point in the course of up to the point of the contact of the film or sheet extruded from the die with the paper substrate, preferably in the vicinity of the contact point where the extruded film or sheet is coated on the paper substrate. The pressure of the gas to be blown is appropriately determined in view of the thickness of the extruded film or sheet to be coated. However, the pressure of the gas is generally 0.5 to 5 kg/cm$^2$G. The aperture of the top end of a nozzle for blowing the gas is generally 1 to 50 mm$^2$ and preferably 5 to 10 mm$^2$. The distance between the top end of the nozzle and the extruded film or sheet is generally 2 to 100 mm and preferably 5 to 20 mm. If the top end of the blowing nozzle is directed to the outer side of the extruded film or sheet from the inner side thereof, the film or sheet is expanded by the blown gas and the effect of further narrowing neck-in is preferably attained.

When the poly-4-methyl-1-pentene constituting the inner layer is extrusion-coated, the extrusion temperature is ordinarily 250° to 370° C. and preferably 290° to 340° C. The extrusion-coating speed (the take-up speed of the covering material) is generally at least 100 m/min and preferably 150 to 500 m/min. The thickness of the poly-4-methyl-1-pentene layer and paper are not particularly critical, but the thickness of the poly-4-methyl-1-pentene and paper layers are generally 1 to 2000 μm and 5 to 5000 μm, respectively, and preferably 5 to 50 μm and 100 to 600 μm, respectively.

Known additives such as a weathering stabilizer, a heat stabilizer, an antistatic agent, an antifogging agent, an antiblocking agent, a slip agent and a colorant can be incorporated into the poly-4-methyl-1-pentene used in the present invention, so far as the intended objects of the present invention can be attained.

Film or Sheet Comprising Intermediate Layer

In the case where a resin layer of a propylene polymer or polyester type polymer is formed as the intermediate layer, poly-4-methyl-1-pentene having an ordinary melting point, for example, a melting point of 190° to 245° C. is used. The kinds of the poly-4-methyl-1-pentene and comonomer are the same as described above. The same paper layer as described above is used.

(1) Intermediate Layer of Propylene Polymer

The propylene polymer constituting the intermediate layer in the present invention includes a crystalline homopolymer having MFR of 1 to 200 g/10 min, preferably 10 to 100 g/10 min, and a crystalline copolymer of propylene with up to 15 mole % of other olefin such as ethylene, 1-butene, 1-hexene, 4-methyl-1-pentene or 1-octene.

Since the poly-4-methyl-1-pentene and propylene polymer constituting the outer layer (covering layer) and intermediate layer in the present invention have an excellent adaptability to the extrusion coating at a high speed, the extrusion coating can be performed at a high speed, as described hereinbefore.

Furthermore, as described hereinbefore, neck-in or edge wave on both the ends of the extruded film or sheet can be prevented by blowing a gas such as air or nitrogen gas to both the ends of the extruded film or sheet.

The above-mentioned method can be similarly adopted for blowing the gas to the extruded film or sheet, and the extrusion temperature for extrusion-coating the poly-4-methyl-1-pentene and propylene polymer is the same as the above-mentioned extrusion temperature adopted for the two-layer film or sheet.

In the laminated film or sheet of the present embodiment, the thicknesses of the poly-4-methyl-1-pentene layer, propylene polymer layer and paper layer can be optionally selected, but the thicknesses of the poly-4-methyl-1-pentene layer, propylene polymer layer and paper layer are generally 1 to 2000 μm, 1 to 2000 μm and 5 to 5000 μm, respectively, and preferably 5 to 50 μm, 5 to 50 μm and 100 to 600 μm, respectively.

Known additives such as a weathering stabilizer, a heat stabilizer, an antistatic agent, an antifogging agent, an antiblocking agent, a slip agent and a colorant can be incorporated in each of the poly-4-methyl-1-pentene and propylene polymer used in the present invention, so far as the attainment of the intended objects of the present invention is not inhibited.

According to this embodiment of the present invention, by adopting a laminate structure of poly-4-methyl-1-pentene layer/propylene polymer layer/paper layer for the laminated film or sheet, even if oil and fat components fall in contact with the poly-4-methyl-1-pentene layer, the permeation of these components can be completely prevented. A carton prepared from this laminated film or sheet shows an excellent oil resistance, and therefore, this carton can be advantageously used as a tray to be used for cooking in an electronic oven, a carton for a food containing oil and fat components, such as a cake or a bun, and other packaging vessels.

(2) Intermediate Layer of Polyester Type Polymer

The polyester type polymer constituting the intermediate layer in the present invention is a thermoplastic polyester resin comprising main recurring units of ethylene terephthalate or butylene terephthalate and having an intrinsic viscosity [η] of 0.4 to 1.5 dl/g, preferably 0.5 to 1.2 dl/g, and a melting point of 210° to 265° C., preferably 220° to 260 ° C., which is derived from terephthalic acid as the main acid component and a diol such as ethylene glycol or 1,4-butanediol as the main polyhydric alcohol component. Polyethylene terephthalate is preferably used since this polyester has an excellent extrusion lamination processability.

The laminated film or sheet of the present embodiment can be prepared by extrusion-coating poly-4-methyl-1-pentene and an intermediate layer-forming polyester directly on paper by co-extrusion. Alternatively, there can be adopted a method in which in order to further increase the adhesion strength between the paper and intermediate layer, according to a known method, the paper surface is coated with an anchor coat agent of an organic titanium, polyethyleneimine or isocyanate type or an adhesive polyethylene or high-pressure polyethylene is coated as the undercoat on the paper surface, and the poly-4-methyl-1-pentene and polyester type polymer are extrusion-coated on the treated paper surface. In the latter case, a laminated film or sheet having a four-layer structure is obtained.

In the present embodiment, the poly-4-methyl-1-pentene and polyester type polymer are extrusion-coated by the same extrusion-coating method as adopted in the above embodiment using the propylene type polymer for the intermediate layer, and the gas-blowing conditions and extrusion temperature are substantially the same as adopted in the above-mentioned embodiment using the propylene polymer.

In the laminated film or sheet of the present embodiment, the thickness of the poly-4-methyl-1-pentene layer, polyester polymer layer and paper layer can be optionally selected, but the thickness of the poly-4-methyl-1-pentene layer, polyester polymer layer and paper layer are generally 1 to 2000 μm, 1 to 2000 μm and 5 to 5000 μm, respectively, and preferably 5 to 50 μm, 5 to 50 μm and 100 to 600 μm, respectively.

Known additives such as a weathering stabilizer, a heat stabilizer, an antistatic agent, an antifogging agent, an anti-blocking agent, a slip agent and a colorant can be incorporated in each of the poly-4-methyl-1-pentene and polyester polymer used in the present invention, so far as the attainment of the intended objects of the present invention is not inhibited.

According to this embodiment of the present invention, by adopting a laminate structure of poly-4-methyl-1-pentene layer/polyester polymer layer/paper layer for the laminated film or sheet, even if oil and fat components fall in contact with the poly-4-methyl-1-pentene layer, the permeation of these components can be completely prevented. A carton prepared from this laminated film or sheet shows an excellent oil resistance, and therefore, this carton can be advantageously used as a tray to be used for cooking in an electronic oven, a carton for a food containing oil and fat components, such as a cake or a bun, and other packaging vessels.

(3) Laminate Comprising Two Poly-4-methyl-1-pentene Layers

In this embodiment, a crystalline homopolymer of 4-methyl-1-pentene or a crystalline copolymer of 4-methyl-1-pentene with up to 20 mole %, preferably up to 12 mole %, of other α-olefin such as ethylene, propylene, 1-butene, 1-hexene, 1-octene, 1-decene, 1-tetradecene or 1-octadecene, which has a melting point of 220° to 245 ° C., especially 225° to 240° C., is preferably used as the high-melting-point poly-4-methyl-1-pentene. This polymer can be prepared according to a known process, for example, the process disclosed in Japanese Unexamined Patent Publication No. 59-206418. MFR of the high-melting-point poly-4-methyl-1-pentene is preferably 5 to 1000 g/10 min, and poly-4-methyl-1-pentene having MFR of 70 to 300 g/10 min is especially preferably used since the moldability and heat resistance are very good.

MFR of the low-melting-point poly-4-methyl-1-pentene is within the same range as that of the above-mentioned high-melting-point of poly-4-methyl-1-pentene, but the melting point is 190° to 230° C., preferably 200° to 230° C. Also this polymer can be prepared according to the process disclosed in Japanese Unexamined Patent Publication No. 59-206418. A polymer having a melting point within the above-mentioned range can be obtained by increasing the amount copolymerized of the α-olefin over the amount of the comonomer used for the production of the high-melting-point poly-4-methyl-1-pentene.

In general, increase of the amount of the α-olefin to be copolymerized results in lowering of the melting point, but the melting point is influenced by the kind of the α-olefin, the catalyst use other polymerization conditions. However, since the relations of these factors to the melting point can be experimentally determined in advance, persons skilled in the art will easily obtain poly-4-methyl-1-pentene having a desired melting point.

As is apparent from the foregoing description, there is a substantial difference of the melting point between the high-melting-point and low-melting-point poly-4-methyl-1-pentenes used in this embodiment of the present invention. The melting point ranges of both the polymers partially overlap each other, but it is indispensable that the high-melting-point poly-4-methyl-1-pentene should have a melting point higher than the melting point of the low-melting-point poly-4-methyl-1-pentene constituting the intermediate layer.

In the present embodiment, by forming one layer of high-melting-point poly-4-methyl-1-pentene having a higher rigidity and an intermediate layer of poly-4-methyl-1-pentene having a lower melting point and a lower rigidity, even if the laminated film or sheet is heated in an electronic oven, oil and fat components as mentioned above are not allowed to permeate into another layer, that is, the paper layer, through these two layers, and therefore, the laminated film or sheet is very suitable as a material for a vessel.

The extrusion temperature adopted for extrusion-coating two poly-4-methyl-1-pentenes constituting the inner and intermediate layers on the paper substrate is generally 250° to 370° C. and preferably 290° to 340° C. The extrusion-coating speed (the take-up speed of the covering material) is generally at least 100 m/min and preferably 150 to 500 m/min.

In the laminated film or sheet of the present embodiment, the thickness of the high-melting-point poly-4-methyl-1-pentene layer, low-melting-point poly-4-methyl-1-pentene layer and paper layer can be optionally selected, but the thickness of the high-melting-point poly-4-methyl-1-pentene layer, low-melting-point poly-4-methyl-1-pentene layer and paper layer are generally 1 to 2000 µm, 1 to 2000 µm and 5 to 5000 µm, respectively, and preferably 5 to 50 µm, 5 to 50 µm and 100 to 600 µm, respectively.

Known additives such as a weathering stabilizer, a heat stabilizer, an antistatic agent, an antifogging agent, an antiblocking agent, a slip agent and a colorant can be incorporated in each of the two poly-4-methyl-1-pentenes used in the present invention, so far as the attainment of the intended objects of the present invention is not inhibited.

According to this embodiment of the present invention, by adopting a laminate structure of high-melting-point poly-4-methyl-1-pentene layer/low-melting-point poly-4-methyl-1-pentene layer/paper layer for the laminated film or sheet, even if oil and fat components fall in content with the high-melting-point poly-4-methyl-1-pentene layer, the carton prepared from this laminate film or sheet shows an excellent oil resistance, and therefore, this carton can be advantageously used as a tray to be used for cooking in an electronic oven, a carton for a food containing oil and fat components, such as a cake or a bun, and other packaging vessels.

Since the laminated film or sheet of the present invention has excellent oil resistance and heat resistance, the laminated film or sheet can be advantageously used as release paper for the production of an artificial leather. More specifically, the laminated film or sheet is passed through between a nip roll and an embossing roll to form a convexity-concavity embossed pattern or grain pattern on the surface of the poly-4-methyl-1-pentene layer, and the patterned surface of the poly-4-methyl-1-pentene layer is coated with a PVC sol or polyurethane solution as the starting material of an artificial leather. The obtained three-layer laminate is heated in an oven to cure the PVC or polyurethane layer. Then, the release paper comprising the poly-4-methyl-1-pentene and paper is peeled from the obtained three-layer cured body, whereby an artificial leather member composed of PVC or polyurethane, which has the embossed pattern or grain pattern transferred on the surface thereof, can be obtained.

Since this release paper for an artificial leather is heated for curing the PVC or polyurethane layer coated on the surface thereof, the release paper should have an excellent heat resistance. Since the poly-4-methyl-1-pentene constituting the outer layer of the laminated film or sheet of the present invention has a high melting point, a high heat resistance can be manifested.

When the PVC or polyurethane layer having the embossed or grain pattern transferred thereon is separated by peeling, there is a risk of the pattern-forming outer layer of the poly-4-methyl-1-pentene together with the PVC or polyurethane layer. However, in the present invention, since the outer layer and paper layer are tightly bonded to each other through the intermediate layer of the low-melting-point poly-4-methyl-1-pentene, peeling of the outer layer together with the PVC or polyurethane layer can be prevented. Accordingly, the laminated film or sheet of the present invention can be used as an excellent release paper for an artificial leather.

The present invention will now be described in detail with reference to the following examples that by no means limit the scope of the invention.

In the examples, the melting point, MFR and initial modulus of elasticity were measured according to the following methods.

Melting Point

By using a differential scanning calorimeter (model DSC-II supplied by Perkin-Elmar), a sample was melting at 260° C. for 5 minutes, cooled to room temperature at a rate of 20° C./min to effect crystallization and maintained at room temperature, an endothermic curve was determined at a temperature-elevating rate of 10° C./min, and the peak temperature was designated as the melting point. The poly-4-methyl-1-pentene used in the present invention shows one endothermic peak or a plurality of endothermic peaks. When a plurality of peaks were observed, the highest peak temperature was designated as the melting point.

MFR

The MFR value was measured under a load of 5 kg at 260° C. according to ASTM D-1238.

Initial Modulus of Elasticity

The initial modulus of elasticity was measured according to ASTM S-790 (the test speed was adjusted to 5 mm/min).

MFR of Polypropylene

MFR of polypropylene was measured under a load of 2.16 kg at 230° C. according to ASTM D-1238.

Intrinsic Viscosity [η] of polyethylene Terephthalate Resin

The intrinsic viscosity of a polyethylene terephthalate resin was measured at a temperature of 23° C. in a phenol/tetrachloroethane mixed solvent (weight ratio=1/1)

EXAMPLE 1

A crystalline copolymer of 4-methyl-1-pentene with 1-octadecene (1-octadecene content of 6% by weight) [hereinafter referred to as "PMP (1)"] having a melting point of 226° C., MFR of 26 g/10 min and an initial flexural modulus of elasticity of 5000 kg/cm$^2$ was melted in an extruder having a screw diameter of 65 mm and laminated on a milk carton paper having a base weight of 290 g/m$^2$. The coating thickness of PMP (1) was 20 µm A case having a size of 10 cm×10 cm×5 cm (depth) was prepared from the laminated paper so that the coating layer was located on the inner surface.

Then, weighed 40 g of commercially available margarine (supplied by Yukijirushi Nyugyo) was placed in the case and heated for 30 seconds by an electronic oven (Type NE-A740 supplied by Matsushita Denki Sangyo). After the heating, the case was allowed to stand still at room temperature, and the number of days required for the margarine to exude to the outer surface of the paper layer was determined by the visual inspection.

A case prepared in the same manner as described above was charged with a starting powder of a chocolate cake (House Range Gourmet supplied by House Shokuhin) and water, and cooking was carried out for 3 minutes and 30 seconds by using the same electronic oven as described above. After the cooking, exudation of the content to the outer surface was examined without taking out the content from the case.

Similarly, a case prepared in the same manner as described above was charged with a starting powder of butter cake (House Range Gourmet supplied by House Shokuhin) and water, and cooking was carried out at a set temperature of 190° C. for 20 minutes in an oven. After the cooking, exudation of the content to the outer surface was examined without taking out the content from the case.

The obtained results are shown in Table 1.

EXAMPLE 2

The procedures of Example 1 were repeated in the same manner except that a crystalline copolymer of 4-methyl-1-pentene with decene (decene content=8% by weight) [hereinafter referred to as "PMP (II)"] having a melting point of 221° C., MFR of 26 g/10 min and an initial flexural modulus of elasticity of 400 kg/cm$^2$ was used instead of PMP (I) used in Example 1.

The obtained results are shown in Table 1.

Comparative Example 1

The procedures of Example 1 were repeated in the same manner except that a homopolymer of 4-methyl-1-pentene [hereinafter referred to as "PMP (H)"] having a melting point of 242° C., MFR of 26 g/10 min and an initial flexural modulus of elasticity of 19000 kg/cm$^2$ was used instead of PMP (I) used in Example 1.

The obtained results are shown in Table 1.

Comparative Example 2

The procedures of Example 1 were repeated in the same manner except that a crystalline copolymer of 4-methyl-1-pentene with 1-decene (1-decene content of 2.5% by weight) [hereinafter referred to as "PMP (III)"] having a melting point of 237° C., MFR of 180 g/10 min and an initial flexural modulus of elasticity of 13000 kg/cm$^2$ was used instead of PMP (I) used in Example 1.

The obtained results are shown in Table 1.

TABLE 1

| | Example 1 | Example 2 | Comparative Example 1 | Comparative Example 2 |
|---|---|---|---|---|
| Structure | | | | |
| coating resin | PMP(I) | PMP(II) | PMP (H) | PMP(III) |
| coating thickness | 20 μm | 20 μm | 20 μm | 20 μm |
| Number of days for exudation of margarine (electronic oven) | exudation was not caused for 20 days, and test was stopped | same as in Example 1 | 2 | 4 |
| Number of days for exudation of chocolate cake (electronic oven) | exudation was not caused for 20 days, and test was stopped | same as in Example 1 | 1 | 3 |
| Number of days for exudation of butter cake (oven) | exudation was not caused for 20 days, and test was stopped | same as in Example 1 | 1 | 3 |

EXAMPLE 3

PMP (III) in Comparative Example 2 and a propylene homopolymer [hereinafter referred to as "PP (1)"] having MFR of 30 g/10 min were independently melted in extruders having a screw diameter of 65 mm, and the melts were laminated on a milk carton paper having a base weight of 290 g/mm$^2$ by using a coextrusion two-layer die. The total coating thickness was 30 μm and each of the coating layers had a thickness of 15 μm. A case having a size of 10 cm×10 cm×5 cm (depth) was prepared from the obtained laminated paper so that the coating layer was located on the inner surface.

Then, weighed 40 g of commercially available margarine (supplied by Yukijirushi Nyugyo) was placed in the case and heated for 30 seconds by an electronic oven (Type NE-A740 supplied by Matsushita Denki Sangyo). After the heating, the case was allowed to stand still at room temperature, and the number of days required for the margarine to exude to the outer surface of the paper layer was determined by the visual inspection.

A case prepared in the same manner as described above was charged with a starting powder of a chocolate cake (House Range Gourmet supplied by House Shokuhin) and water, and cooking was carried out for 3 minutes and 30 seconds by using the same electronic oven as described above. After the cooking, exudation of the content to the outer surface was examined without taking out the content from the case.

Similarly, a case prepared in the same manner as described above was charged with a starting powder of butter cake (House Range Gourmet supplied by House Shokuhin) and water, and cooking was carried out at a set temperature of 190° C. for 20 minutes in an oven. After the cooking, exudation of the content to the outer surface was examined without taking out the content from the case.

The obtained results are shown in Table 2.

EXAMPLE 4

The procedures of Example 3 were repeated in the same manner except that the coating thickness of PMP (III) used in Example 2 was changed to 10 μm and the coating thickness of PP (I) was changed to 20 μm. The obtained results are shown in Table 2.

EXAMPLE 5

The procedures of Example 3 were repeated in the same manner except that ethylene/propylene random copolymer having ethylene content of 5% by weight [hereinafter referred to as "PP (II)"] was used instead of PP (I) used in Example 3. The obtained results are shown in Table 2.

Comparative Example 3

The procedures of Example 3 were repeated in the same manner except that a resin mixture comprising PMP (III) and PP (I) at a ratio of 3/1 was used instead of PP (I) used in Example 3. The obtained results are shown in Table 2.

Comparative Example 4

The procedures of Example 3 were repeated in the same manner except that a resin mixture comprising PMP (III) and PP (I) at a ratio of 1/1 was used instead of PP (I) used in Example 3, whereby a product having a total coating thickness of 30 μm was obtained.

The exudation test was carried out in the same manner as described in Example 3. The obtained results are shown in Table 2.

Comparative Example 5

By using a single-layer die instead of the coextrusion two-layer die used in Example 3, PMP (III) was laminated in a coating thickness of 15 μm. Then, PMP (III) was laminated again in a thickness of 15 μm while opening a roll of the semi-finished product once wound to obtain a product having a total coating thickness of 30 μm. Also this product was subjected to the exudation test in the same manner as described in Example 3. The obtained results are shown in Table 2.

TABLE 2

|  | Example 3 | Example 4 | Example 5 | Comparative Example 3 | Comparative Example 4 | Comparative Example 5 |
|---|---|---|---|---|---|---|
| Structure |  |  |  |  |  |  |
| inner layer | PMP (III) | PMP (III) | PMP (III) | PMP (III) | PMP (III) | PMP (III) |
| intermediate layer | PP (I) | PP (I) | PP (II) | PMP (I) + PP (I) (75) (25) | PMP (I) + PP (I) (50) (50) | PMP (I) |
| outer layer | milk carton paper | milk carton paper | milk carton paper | milk carton paper | milk carton paper | milk carton paper |
| Thickness (μm) |  |  |  |  |  |  |
| inner layer | 15 | 10 | 15 | 15 | 15 | 15 |
| intermediate layer | 15 | 20 | 15 | 15 | 15 | 15 |
| outer layer | 300 | 300 | 300 | 300 | 300 | 300 |
| Number of days for exudation of margarine | exudation was not caused for 20 days, and test was stopped | same as in Example 3 | same as in Example 3 | 1 | 2 | 4 |
| Number of days for exudation of chocolate cake | exudation was not caused for 20 days, and test was stopped | same as in Example 3 | same as in Example 3 | 3 | 3 | 3 |
| Number of days for exudation of butter cake | exudation was not caused for 20 days, and test was stopped | same as in Example 3 | same as in Example 3 | 5 | 5 | 5 |

Note
Each parenthesized value indicates the blending ratio.

EXAMPLE 6

PMP (III) and polyethylene terephthalate [hereinafter referred to as "PET (I)"] having an intrinsic viscosity [η] of 0.6 were independently melted in extruders having a screw diameter of 65 mm and the melts were laminated on milk carton paper having a base weight of 290 g/mm$^2$ by using a coextrusion two-layer die. The total coating thickness was 30 μm, and each of the laminated layers had a thickness of 15 μm. A case having a size of 10 cm×10 cm×5 cm (depth) was prepared from the obtained laminated paper so that the coating layer was located on the inner surface.

Then, weighed 40 g of commercially available margarine (supplied by Yukijirushi Nyugyo) was placed in the case and heated for 30 seconds by an electronic oven (Type NE-A740 supplied by Matsushita Denki Sangyo). After the heating, the case was allowed to stand still at room temperature, and the number of days required for the margarine to exude to the outer surface of the paper layer was determined by the visual inspection.

A case prepared in the same manner as described above was charged with a starting powder of a chocolate cake (House Range Gourmet supplied by House Shokuhin) and water, and cooking was carried out for 3 minutes and 30 seconds by using the same electronic oven as described above. After the cooking, exudation of the content to the outer surface was examined without taking out the content from the case.

Similarly, a case prepared in the same manner as described above was charged with a starting powder of butter cake (House Range Gourmet supplied by House Shokuhin) and water, and cooking was carried out at a set temperature of 190° C. for 20 minutes in an oven. After the cooking, exudation of the content to the outer surface was examined without taking out the content from the case.

The obtained results are shown in Table 3.

EXAMPLE 7

The procedures of Example 6 were repeated in the same manner except that the coating thickness of PMP (III) used in Example 6 was changed to 20 μm and the thickness of the coating layer of PET (I) was changed to 10 μm. The obtained results are shown in Table 3.

TABLE 3

|  | Example 6 | Example 7 |
|---|---|---|
| Structure |  |  |
| inner layer | PMP(III)(15) | PMP(III)(20) |
| intermediate layer | PET(I) (15) | PET(I) (10) |
| outer layer | milk carton paper (300) | milk carton paper (300) |
| Number of days for exudation of margarine | exudation was not caused for 20 days, and test was stopped | same as in Example 6 |
| Number of days for exudation of chocolate cake (electronic oven) | exudation was not caused for 20 days, and test was stopped | same as in Example 6 |
| Number of days for exudation of butter cake (oven) | exudation was not caused for 20 days, and test was stopped | same as in Example 6 |

Note
Unit of each parenthesized value is μm.

EXAMPLE 8

PMP (III) in Comparative Example 2 and PMP (I) in Example 1 were independently melted in extruders having a screw diameter of 65 mm, and the melts were laminated on a milk carton paper having a base weight of 290 g/mm$^2$ by using a coextrusion two-layer die. The total coating thickness was 30 μm, and each of the coating layers had a thickness of 15 μm. A case having a size of 10 cm×10 cm×5 cm (depth) was prepared from the obtained laminated paper so that the coating layer was located on the inner surface.

Then, weighed 40 g of commercially available margarine (supplied by Yukijirushi Nyugyo) was placed in the case and heated for 30 seconds by an electronic oven (Type NE-A740 supplied by Matsushita Denki Sangyo). After the heating, the case was allowed to stand still at room temperature, and the number of days required for the margarine to exude to the outer surface of the paper layer was determined by the visual inspection.

A case prepared in the same manner as described above was changed with a starting powder of a chocolate cake (House Range Gourmet supplied by House Shokuhin) and water, and cooking was carried out for 3 minutes and 30 seconds by using the same electronic oven as described above. After the cooking, exudation of the content to the outer surface was examined without taking out the content from the case.

Similarly, a case prepared in the same manner as described above was charged with a starting powder of butter cake (House Range Gourmet supplied by House Shokuhin) and water, and cooking was carried out at a set temperature of 190° C. for 20 minutes in an oven. After the cooking, exudation of the content to the outer surface was examined without taking out the content from the case.

The obtained results are shown in Table 4.

EXAMPLE 9

The procedures of Example 8 were repeated in the same manner except that a crystalline copolymer of 4-methyl-1-pentene with octadecene (octadecene content of 4% by weight) [hereinafter referred to as "PMP (III)"] having a melting point of 229° C., MFR of 10 min and an initial flexural modulus of elasticity of 8000 kg/cm² was used instead of PMP (I) used in Example 1. The obtained results are shown in Table 4.

Comparative Example 6

The procedures of Example 8 were repeated in the same manner except that PMP (III) used in Example 2 was used for both of the coextruded layers. The obtained results are shown in Table 4.

TABLE 4

|  | Example 8 | Example 9 | Comparative Example 6 |
|---|---|---|---|
| Structure |  |  |  |
| inner layer | PMP(III) (15 μm) | PMP(I) (15 μm) | PMP(III) (15 μm) |
| intermediate layer | PMP(I) (15 μm) | PMP(IV) (15 μm) | PMP(I) (15 μm) |
| paper |  |  |  |
| Number of days for exudation of margarine | exudation was not caused for 20 days, and test was stopped | same as in Example 8 | 4 |
| Number of days for exudation of chocolate cake (electronic oven) | exudation was not caused for 20 days, and test was stopped | same as in Example 8 | 3 |
| Number of days for exudation of butter cake (oven) | exudation was not caused for 20 days, and test was stopped | same as in Example 8 | 5 |

Note
Unit of each parenthesized value is μm.

We claim:
1. A laminated film or sheet having at least two layers, which comprises (A) a layer consisting essentially of poly-4-methyl-1-pentene having a melting point of 190° to 230° C. and (B) a paper layer laminated directly to layer (A).

2. A laminated film or sheet as set forth in claim 1, wherein the thickness of the layer (A) is 1 to 2000 μm and the thickness of the layer (B) is 5 to 5000 μm.

3. A laminated film or sheet as set forth in claim 1 or 2, wherein the melt flow rate of the poly-4-methyl-1-pentene is 5 to 1000 g/10 min.

4. A box-shaped vessel prepared from a laminated film or sheet as set forth in claim 1.

5. A laminated film or sheet having at least three layers, which comprises (A) a layer consisting essentially of poly-4-methyl-1-pentene, (B) an intermediate layer of a crystalline homopolymer of propylene or a crystalline copolymer comprising at least 85 mole % propylene and up to 15 mole % of another olefin, said intermediate layer (B) being laminated directly to layer (A) and (C) a paper layer laminated to the intermediate layer (B).

6. A laminated film or sheet as set forth in claim 5, wherein the poly-4-methyl-1-pentene has a melting point of 190° to 245° C.

7. A laminated film or sheet as set forth in claim 5, wherein the poly-4-methyl-1-pentene has a melting point of 190° to 230° C.

8. A laminated film or sheet as set forth in claim 5, wherein the intermediate layer is composed of polypropylene having a melt flow rate of 1 to 200 g/10 min.

9. A laminated film or sheet as set forth in claim 5, wherein the polypropylene layer has a thickness of 5 to 5000 μm.

10. A box-shaped vessel prepared from a laminated film or sheet as set forth in claim 5.

11. A laminated film or sheet as set forth in claim 1, wherein said poly-4-methyl-1-pentene having a melting point of 190° to 230° C. is a homopolymer of 4-methyl-1-pentene or a copolymer of 4-methyl-1-pentene with up to 20 mole % of an α-olefin having 2 to 20 carbon atoms.

12. A laminated film or sheet as set forth in claim 5, wherein said poly-4-methyl-1-pentene is a homopolymer of 4-methyl-1-pentene or a copolymer of 4-methyl-1-pentene with up to 20 mole % of an α-olefin having 2 to 20 carbon atoms.

13. A laminated film or sheet as set forth in claim 5, wherein said propylene polymer is a crystalline homopolymer having an MFR of 1 to 200 g/10 min or a crystalline copolymer of propylene with up to 15 mole % of ethylene, 1-butene, 1-hexene, 4-methyl-1-pentene or 1-octene.

14. A laminated film or sheet having at least three layers, which comprises
(A) a layer consisting essentially of poly-4-methyl-1-pentene, (B) an intermediate layer of (1) a crystalline propylene polymer, (2) a polyester polymer, or (3) a poly-4-methyl-1-pentene having a lower melting point than said poly-4-methyl-1-pentene of layer (A), said intermediate layer (B) being laminated directly to layer (A), and (C) a paper layer laminated to the intermediate layer (B).

15. The laminated film or sheet of claim 5 wherein the intermediate layer (B) is a crystalline homopolymer of propylene.

16. The laminated film or sheet of claim 5 wherein the intermediate layer (B) is a crystalline copolymer of propylene with another olefin, wherein said another olefin is ethylene, 1-butene, 1-hexane, 4-methyl-1-pentene or 1-octene.

* * * * *